US009958055B2

(12) United States Patent
Iwasaki et al.

(10) Patent No.: US 9,958,055 B2
(45) Date of Patent: May 1, 2018

(54) AUTOMATIC TRANSMISSION (71) Applicant: MAZDA MOTOR CORPORATION, Hiroshima (JP)

(72) Inventors: Tatsuhiko Iwasaki, Hiroshima (JP); Shinya Kamada, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 15/316,808

(22) PCT Filed: May 28, 2015

(86) PCT No.: PCT/JP2015/002698
§ 371 (c)(1),
(2) Date: Dec. 6, 2016

(87) PCT Pub. No.: WO2015/194099
PCT Pub. Date: Dec. 23, 2015

(65) Prior Publication Data
US 2017/0146113 A1    May 25, 2017

(30) Foreign Application Priority Data
Jun. 16, 2014   (JP) ................................ 2014-123209

(51) Int. Cl.
*F16H 57/04*     (2010.01)
*F16H 3/66*      (2006.01)
(Continued)

(52) U.S. Cl.
CPC ........... *F16H 57/0479* (2013.01); *F16H 3/66* (2013.01); *F16H 57/043* (2013.01);
(Continued)

(58) Field of Classification Search
CPC . F16H 57/0479; F16H 57/043; F16H 57/0484
See application file for complete search history.

(56) References Cited

U.S. PATENT DOCUMENTS 8,162,793 B2 * 4/2012 Diosi .................... F16H 57/082
475/159
2010/0222173 A1 9/2010 Diosi et al.
(Continued)

FOREIGN PATENT DOCUMENTS

EP    2438324 B1    7/2013
JP    S58-196366 A  11/1983
(Continued)

OTHER PUBLICATIONS

International Search Report issued in PCT/JP2015/002698; dated Aug. 18, 2015.

*Primary Examiner* — Erin D Bishop
(74) *Attorney, Agent, or Firm* — Studebaker & Brackett PC (57) ABSTRACT An automatic transmission (1) includes first, second, and third planetary gear sets (10, 20, 30) and a lubricant feed passage (L2). The first and second planetary gear sets (10, 20) form a two-stage planetary gear set (40). The third planetary gear set (30) is adjacent to the two-stage planetary gear set on one axial side of the automatic transmission. The lubricant feed passage (L2) feeds a lubricant to a bearing (25) of the second planetary gear set located on an outer periphery of the two-stage planetary gear set (40). The lubricant feed passage feeds the lubricant from a first inlet (37e) to the bearing via a first oil passage (37f) and oil passages (26a, 26b, 26c) in a pinion shaft. The first inlet (37e) is formed on a side of a carrier body (37) opposite to the two-stage planetary gear set and on an inner periphery of the automatic transmission.

3 Claims, 4 Drawing Sheets (51) Int. Cl.
   *F16H 57/08* (2006.01)
   *F16H 3/44* (2006.01)
(52) U.S. Cl.
   CPC ....... *F16H 57/0484* (2013.01); *F16H 57/082* (2013.01); *F16H 2003/442* (2013.01); *F16H 2200/201* (2013.01)

(56) References Cited

U.S. PATENT DOCUMENTS

2012/0088628 A1   4/2012   Ziemer et al.
2013/0244823 A1   9/2013   Iizuka et al.

FOREIGN PATENT DOCUMENTS

JP   2008-545105 A   12/2008
JP   2013-194826 A    9/2013

* cited by examiner

PRIOR ART

AUTOMATIC TRANSMISSION

TECHNICAL FIELD

The present invention belongs to the field of automatic transmission.

BACKGROUND ART

An automatic transmission mounted in a vehicle such as an automobile vehicle generally has a transmission mechanism including planetary gear sets and frictional engagement elements such as clutches and brakes. These frictional engagement elements are selectively engaged to change power transmission paths passing through the planetary gear sets, thereby providing predetermined gear stages in accordance with the driving mode of the vehicle.

In recent years, there have been attempts to increase the number of stages of an automatic transmission to improve, for example, the fuel efficiency of a vehicle. This increases the number of planetary gear sets forming a transmission mechanism. With an increase in the number of planetary gear sets, the axial size of the automatic transmission increases to degrade the mountability of the automatic transmission in the vehicle. In particular, in a transverse automatic transmission whose axial direction agrees with the width direction of the vehicle, interference between the automatic transmission and a frame member, for example, extending in the longitudinal direction of the vehicle may be problematic. This makes the problem of the mountability of the automatic transmission significant.

To address the problem, for example, Patent Document 1 discloses an automatic transmission including a two-stage planetary gear set in which two of planetary gear sets forming a transmission mechanism are stacked one on the other and arranged radially on the inner and outer peripheries. This structure reduces the axial size of the automatic transmission as compared to the arrangement of the two planetary gear sets along the axis of the automatic transmission.

Figure 4:
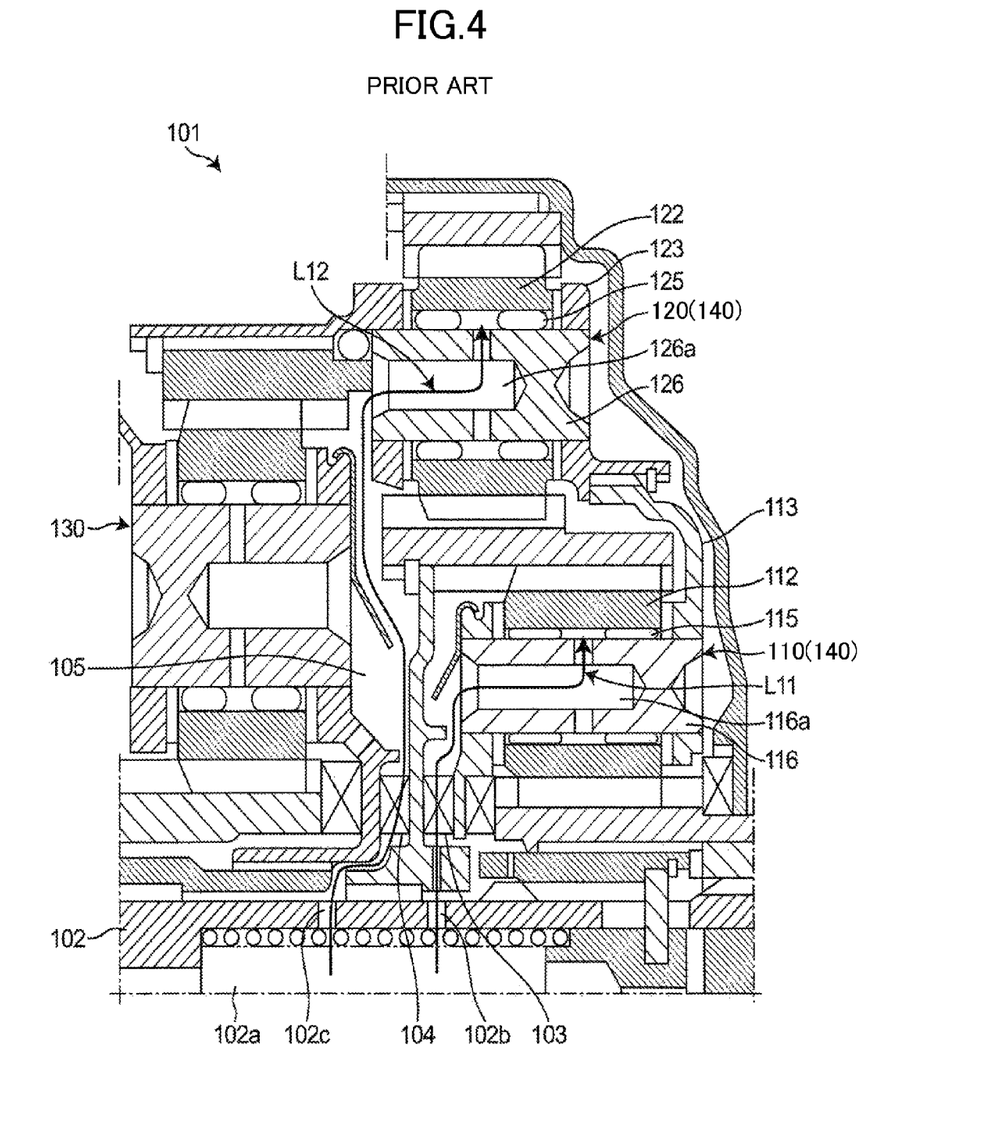
FIG. 4 is a cross-sectional view illustrating an automatic transmission according to prior art.

As shown in FIG. 4, in an automatic transmission 101 of Patent Document 1, a second planetary gear set 120 is located on the outer periphery of a first planetary gear set 110 so that the first and second planetary gear sets 110 and 120 form a two-stage planetary gear set 140. A third planetary gear set 130 is adjacent to the two-stage planetary gear set 140 on one axial side of the automatic transmission 101 (on the left of FIG. 4). This arrangement reduces the axial size of the automatic transmission 101 as compared to the arrangement of the first and second planetary gear sets 110 and 120 along the axis of the automatic transmission 101.

CITATION LIST

Patent Document

[Patent Document 1] European Patent No. 2438324

SUMMARY OF THE INVENTION

Technical Problem

Each of the planetary gear sets forming the transmission mechanism generally includes a sun gear, a ring gear, a pinion, and a carrier. The pinion meshes with the sun gear and the ring gear. The carrier supports the pinion, and includes a pinion shaft and a carrier body. The pinion shaft rotatably supports the pinion. The carrier body supports both ends of the pinion shaft.

The pinion has a smaller radius and rotates at a higher speed than the sun gear and the ring gear. A lubricant needs to be fed to a bearing (e.g., needle bearing) between the pinion and the pinion shaft to secure the performance and durability of each planetary gear set.

In general, a lubricant is fed radially outside from the center of a planetary gear set to a bearing between a pinion and pinion shaft of a planetary gear set. Specifically, the lubricant is once introduced to an oil passage in the pinion shaft, and then fed from the oil passage to the bearing located on the outer periphery of the pinion shaft.

However, in the automatic transmission as described above including the two-stage planetary gear set to reduce the axial size of the automatic transmission, the problem is how to feed a lubricant to the bearing between the pinion and pinion shaft of the planetary gear set on the outer periphery of the two-stage planetary gear set.

In the automatic transmission 101 described in the Patent Document 1, a lubricant is fed to a bearing 115 between a pinion 112 and pinion shaft 116 of the first planetary gear set 110, and a bearing 125 between a pinion 122 and a pinion shaft 126 of the second planetary gear set 120. For this, an input shaft 102 on the axis of the automatic transmission includes an oil passage 102a extending along the axis of the input shaft 102 (i.e., the axis of the automatic transmission 101). Oil feed holes 102b and 102c extending radially from the oil passage 102a to the outer peripheral surface of the input shaft 102 are formed in the input shaft 102. The lubricant is fed radially outside from the oil feed holes 102b and 102c to the bearings 115 and 125 through lubricant feed passages L11 and L12, respectively. Specifically, the lubricant from the oil feed holes 102b and 102c passes through thrust bearings 103 and 104, and is then introduced, radially outside the thrust bearings 103 and 104, to oil passages 116a and 126a in the pinion shafts 116 and 126, respectively. The oil passages 116a and 126a extend along the pinion shafts 116 and 126, respectively. The lubricant is fed from the oil passages 116a and 126a to the bearings 115 and 125, respectively.

The lubricant is fed to the bearing 125 of the planetary gear set 120 on the outer periphery of the two-stage planetary gear set 140 as follows. The lubricant fed radially outside the oil feed hole 102c is released to a space 105 without any component in the transmission case (not shown in FIG. 4). Part of the lubricant is then fed out of the space 105 to the bearing 125 of the planetary gear set 120. Thus, the amount of the lubricant fed to the space 105 needs to be larger than a predetermined amount of lubricant to be fed to the bearing 125. This may increase the size and driving loss of an oil pump.

As described above, in an automatic transmission including a two-stage planetary gear set, there is a demand to efficiently feed a lubricant to a bearing between a pinion and pinion shaft of a planetary gear set on the outer periphery of the two-stage planetary gear set.

In the automatic transmission 101 described in Patent Document 1, the oil feed holes 102b and 102c for feeding a lubricant to the bearings 115 and 125 are aligned in the input shaft 102 along the axis of the automatic transmission 101. The lubricant feed passages L11 and L12 are also aligned along the axis of the automatic transmission 101. Thus, the two-stage planetary gear set 140 cannot sufficiently reduce the axial size of the automatic transmission 101. Reducing the axial size of the automatic transmission as much as possible is desired to obtain excellent mountability of the automatic transmission in a vehicle.

The present invention was made in view of the problems. It is an objective of the present invention to provide a creative lubricant feed passage for a bearing between a pinion and pinion shaft of the planetary gear set on the outer periphery of a two-stage planetary gear set in an automatic transmission to efficiently feed a lubricant to the bearing and reduce the axial size of the automatic transmission.

Solution to the Problem

In order to achieve the objective, the present invention provides an automatic transmission including first, second, and third planetary gear sets, each including a sun gear, a ring gear, a pinion meshing with the sun gear and the ring gear, and a carrier supporting the pinion, and including a pinion shaft rotatably supporting the pinion, and a carrier body supporting two ends of the pinion shaft. The second planetary gear set is located on an outer periphery of the first planetary gear set so that the first and second planetary gear sets form a two-stage planetary gear set. The third planetary gear set is adjacent to the two-stage planetary gear set on one axial side of the automatic transmission. The carrier body of the second planetary gear set is integral with the carrier body of the third planetary gear set. The automatic transmission further includes a lubricant feed passage for the second planetary gear set feeding a lubricant to a bearing between the pinion and pinion shaft of the second planetary gear set. The lubricant feed passage for the second planetary gear set includes a first oil passage in the carrier body of the third planetary gear set, the first oil passage extending from a first inlet axially toward the two-stage planetary gear set and radially outside, the first inlet being formed on a side of the carrier body of the third planetary gear set axially opposite to the two-stage planetary gear set and on an inner periphery of the carrier body of the third planetary gear set, and an oil passage in the pinion shaft of the second planetary gear set, the oil passage communicating with the first oil passage and the bearing of the second planetary gear set. The lubricant feed passage for the second planetary gear set feeds the lubricant from the first inlet to the bearing of the second planetary gear set via the first oil passage and the oil passage in the pinion shaft of the second planetary gear set.

With this configuration, the lubricant feed passage for the second planetary gear set feeds the lubricant from the first inlet to the bearing of the second planetary gear set via the first oil passage in the carrier body of the third planetary gear set, and the oil passage in the pinion shaft of the second planetary gear set. Thus, the lubricant feed passage for the second planetary gear set can be continuous from the first inlet to the bearing of the second planetary gear set through the components of the second and third planetary gear sets. Then, the lubricant from the first inlet is fed to the bearing of the second planetary gear set without being released to a space without any component in the transmission case. As a result, the lubricant is efficiently fed to the bearing of the second planetary gear set.

In some embodiments, the carrier body of the third planetary gear set may include a lubricant feed passage for the third planetary gear set feeding a lubricant to a bearing between the pinion and pinion shaft of the third planetary gear set. In this case, the lubricant feed passage for the second planetary gear set can be located in the carrier body of the third planetary gear set in a position different from the lubricant feed passage for the third planetary gear set along the circumference of the carrier body not to interfere with the lubricant feed passage for the third planetary gear set. This reduces the axial size of the automatic transmission as compared to the arrangement of the lubricant feed passage for the second planetary gear set shifted from the lubricant feed passage for the third planetary gear set in the carrier body of the third planetary gear set along the axis of the automatic transmission. That is, this reduces the axial size of the automatic transmission as much as possible together with the two-stage gear set of the automatic transmission, thereby improving the mountability of the automatic transmission.

In some embodiments, the automatic transmission further includes a lubricant feed passage for the third planetary gear set feeding a lubricant to a bearing between the pinion and pinion shaft of the third planetary gear set. The lubricant feed passage for the third planetary gear set includes a second oil passage in the carrier body of the third planetary gear set, the second oil passage extending from a second inlet radially outside, the second inlet being formed on the side of the carrier body of the third planetary gear set axially opposite to the two-stage planetary gear set and on the inner periphery of the carrier body of the third planetary gear set, and an oil passage in the pinion shaft of the third planetary gear set, the oil passage communicating with the second oil passage and the bearing of the third planetary gear set. The lubricant feed passage for the third planetary gear set feeds the lubricant from the second inlet to the bearing of the third planetary gear set via the second oil passage and the oil passage in the pinion shaft of the third planetary gear set. On the side of the carrier body of the third planetary gear set axially opposite to the two-stage planetary gear set and on the inner periphery of the carrier body of the third planetary gear set, the first and second inlets are arranged in positions axially overlapping with each other and being circumferentially different from each other.

With this configuration, the first and second inlets are arranged in the carrier body of the third planetary gear set in the positions overlapping with each other along the axis of the automatic transmission and being different from each other along the circumference of the automatic transmission. Then, the lubricant feed passage for the second planetary gear set can be easily located in the carrier body of the third planetary gear set in a position different from the lubricant feed passage for the third planetary gear set along the circumference of the carrier body. This further reduces the axial size of the automatic transmission as compared to the arrangement of the first and second inlets shifted from each other along the axis of the automatic transmission.

In some embodiments, in the case where the first and second inlets are arranged as described above, the automatic transmission further includes a shaft member fitted to the inner periphery of the carrier body of the third planetary gear set on the side axially opposite to the two-stage planetary gear set. The shaft member may include a feed port feeding a lubricant from an inside of the shaft member to the first and second inlets.

With this configuration, the feed ports for feeding the lubricants to the first and second inlets may be the common feed port. This simplifies the oil feed passage in the shaft member as compared to the case of individual feed ports.

Advantage of the Invention

As described above, in the automatic transmission according to the present invention, the lubricant feed passage for the second planetary gear set may be continuous from the first inlet to the bearing of the second planetary gear set through the components of the second and third planetary gear sets. Thus, the lubricant from the first inlet is efficiently fed to the bearing of the second planetary gear set without being released to the space in the transmission case. This reduces an increase in the size and driving loss of an oil pump, for example. In addition, the axial size of the automatic transmission is reduced as much as possible, thereby improving the mountability of the automatic transmission.

BRIEF DESCRIPTION OF THE DRAWINGS

FIG. 3 illustrates a lubricant feed passage for a bearing between a pinion and a pinion shaft of each of the second and third planetary gear sets. FIG. 3 is a schematic view illustrating part of the second and third planetary gear sets as viewed in the direction of arrow from a position along the line Y3-Y3 of FIG. 1.

DESCRIPTION OF EMBODIMENTS

An embodiment of the present invention will now be described in detail with reference to the drawings.

Figure 1:
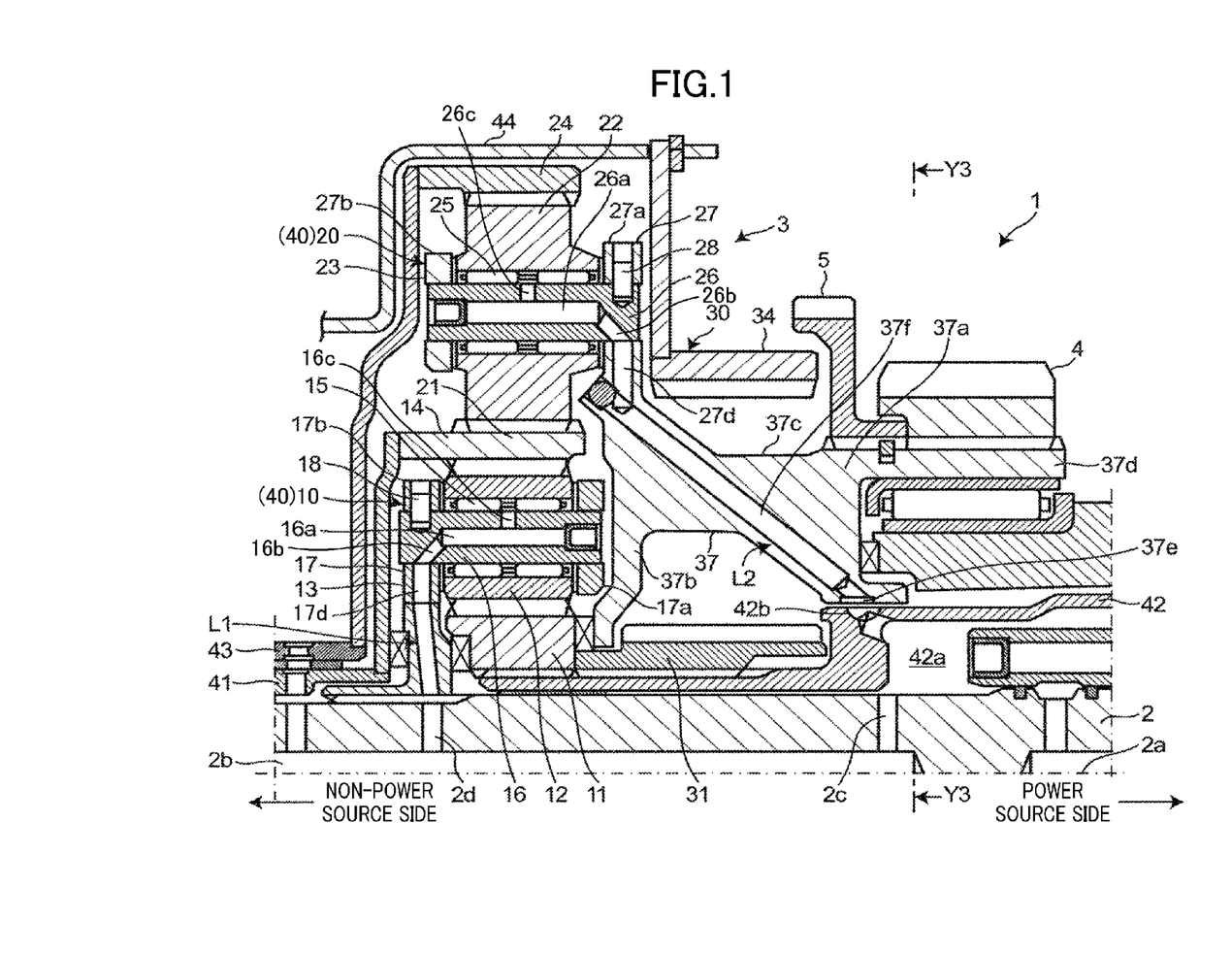
FIG. 1 is a cross-sectional view (taken along the line Y1-Y1 of FIG. 3) illustrating first, second, and third planetary gear sets of an automatic transmission and their periphery, according to an embodiment of the present invention.
Figure 2:
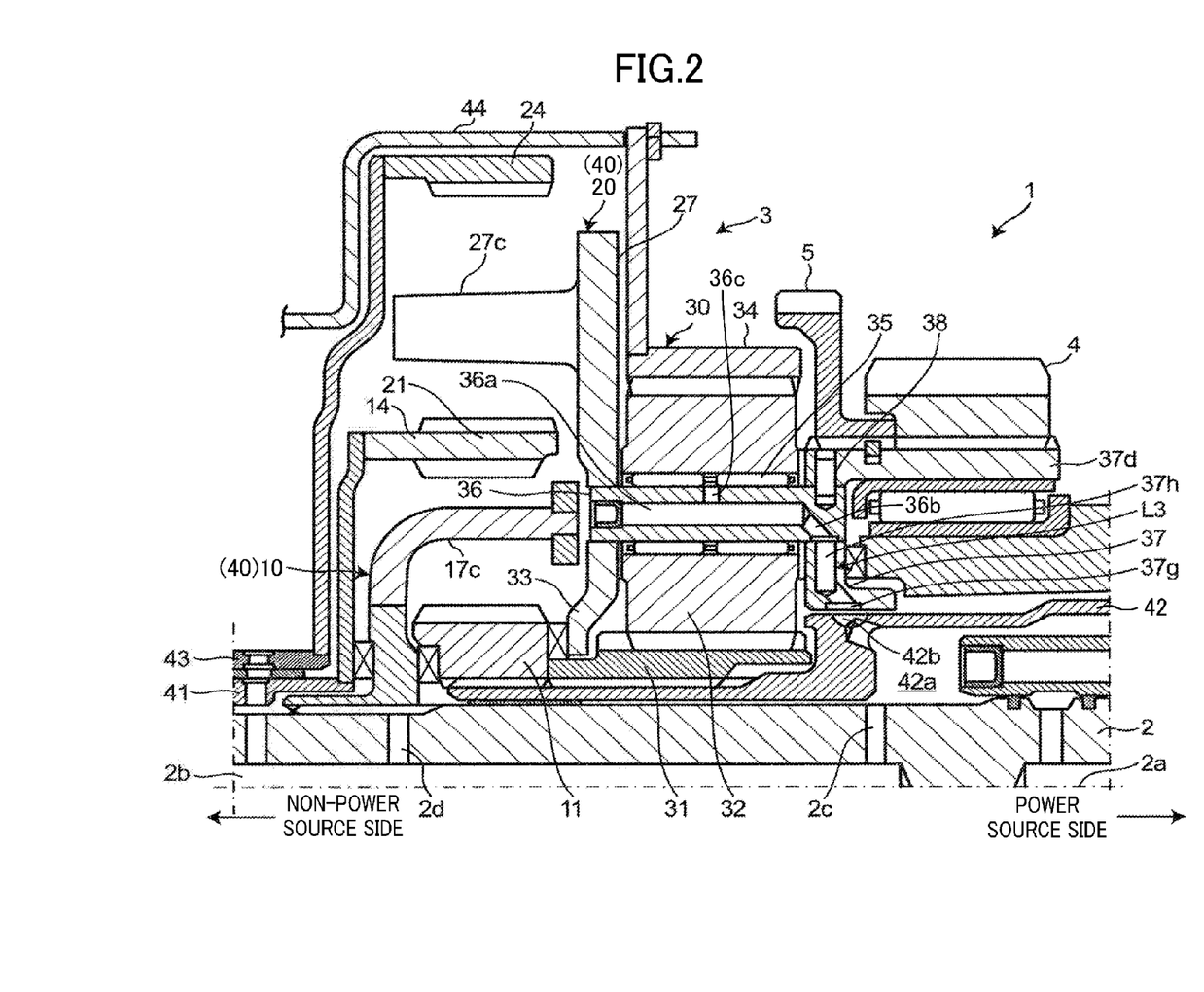
FIG. 2 illustrates a different cross-section (taken along the line Y2-Y2 of FIG. 3) from FIG. 1.

FIGS. 1 and 2 show an automatic transmission 1 according to the embodiment of the present invention, which is mounted in a vehicle such as an automobile vehicle, for example. The automatic transmission 1 includes, in a transmission case (not shown), an input shaft 2, an output gear 4, planetary gear sets, and frictional engagement elements. The input shaft 2 is an input connected to a power source (not shown) such as an engine. The output gear 4 is an output. The planetary gear sets form power transmission paths from the input shaft 2 to the output gear 4. The frictional engagement elements include, for example, clutches and brakes to select one of the power transmission paths and change power transmission paths. The planetary gear sets and the frictional engagement elements form a transmission mechanism 3. The input shaft 2 extends along the axis of the automatic transmission 1 (horizontally in FIGS. 1 and 2) in the axial center of the automatic transmission 1. In this embodiment, the automatic transmission 1 is of a transverse type, which is mounted in the vehicle such that the axial direction of the automatic transmission 1 (i.e., the axial direction of the input shaft 2) agrees with the vehicle width direction. The axial direction of the automatic transmission 1 will be hereinafter simply referred to as "axially" or an "axial" direction. The power source is located on one axial end of the automatic transmission 1 (on the right in FIGS. 1 and 2 in this embodiment).

In the automatic transmission 1, the engagement states of the frictional engagement elements are combined to change power transmission paths passing through the planetary gear sets, thereby changing the gear ratio of the transmission mechanism 3 and obtaining predetermined gear stages. For example, the automatic transmission 1 includes four planetary gear sets and five frictional engagement elements. Selectively engaging three of these frictional engagement elements provides eight forward gears and a reverse gear.

In this embodiment, the transmission mechanism 3 includes at least a first planetary gear set (hereinafter referred to as a "first gear set") 10, a second planetary gear set (hereinafter referred to as a "second gear set") 20, and a third planetary gear set (hereinafter referred to as a "third gear set") 30. These first, second, and third gear sets 10, 20, and 30 are arranged in the transmission case to be closer to the non-power source side (on the left in FIGS. 1 and 2) than the output gear 4.

The first and second gear sets 10 and 20 are radially stacked one inside the other in a substantially same axial position to form a two-stage planetary gear set (hereinafter referred to as a "two-stage gear set") 40. Specifically, the second gear set 20 is located on the outer periphery of the first gear set 10. The third gear set 30 is adjacent to the two-stage gear set 40 on one axial side (e.g., the power source side in this embodiment).

The first, second, and third gear sets 10, 20, and 30 are single-pinion planetary gear sets. The first gear set 10 includes a sun gear 11, a ring gear 14, a plurality of (three in this embodiment) pinions 12, and a carrier 13. The pinions 12 mesh with the sun gear 11 and the ring gear 14. The carrier 13 supports these pinions 12. The pinions 12 are arranged at substantially regular intervals along the circumference of the carrier 13. The second gear set 20 includes a sun gear 21, a ring gear 24, a plurality of (three in this embodiment) pinions 22, and a carrier 23. The pinions 22 mesh with the sun gear 21 and the ring gear 24. The carrier 23 supports these pinions 22. The pinions 22 are arranged at substantially regular intervals along the circumference of the carrier 23 (see FIG. 3). The third gear set 30 includes a sun gear 31, a ring gear 34, a plurality of (three in this embodiment) pinions 32, and a carrier 33. The pinions 32 mesh with the sun gear 31 and the ring gear 34. The carrier 33 supports these pinions 32. The pinions 32 are arranged at substantially regular intervals along the circumference of the carrier 33 (see FIG. 3).

The carrier 13 of the first gear set 10 includes a plurality of (three in this embodiment) pinion shafts 16 and a carrier body 17. Each pinion shaft 16 rotatably supports associated one of the pinions 12 through a bearing 15 such as a needle bearing. The carrier body 17 supports both ends of these pinion shafts 16. The carrier body 17 includes a pair of ring-like plates, namely a power source side plate 17a and a non-power source side plate 17b, and connectors 17c. The power source side plate 17a and the non-power source side plate 17b support the power source side end and the non-power source side end of the pinion shafts 16, respectively. The connectors 17c connect the power source side plates 17a to the non-power source side plate 17b. The connectors 17c are arranged between two of the pinion shafts 16 that are adjacent to each other along the circumference of the carrier 13. The pinion shafts 16 are connected integrally via a pin member 18 that is located in the carrier body 17 (specifically, in the non-power source side plate 17b) to extend along the radius of the carrier 13.

The carrier 23 of the second gear set 20 includes pinion shafts 26 and a carrier body 27. Each pinion shaft 26 rotatably supports associated one of the pinions 22 through a bearing 25 such as a needle bearing. The carrier body 27 supports both ends of these pinion shafts 26. The carrier body 27 includes a pair of ring-like plates, namely a power source side plate 27a and a non-power source side plate 27b, and connectors 27c. The power source side plate 27a and the non-power source side plate 27b support the ends of the pinion shafts 26 on the power source side and the non-power source side, respectively. The connectors 27c connect the power source side plates 27a to the non-power source side plate 27b. The connectors 27c are arranged between two of the pinion shafts 26 that are adjacent to each other along the circumference of the carrier 23 (see FIG. 3). The pinion shafts 26 are connected integrally via a pin member 28 that is located in the carrier body 27 (specifically, in the power source side plate 27a) to extend along the radius of the carrier 23.

The carrier 33 of the third gear set 30 includes pinion shafts 36 and a carrier body 37. Each pinion shaft 36 rotatably supports associated one of the pinions 32 through a bearing 35 such as a needle bearing. The carrier body 37 supports both ends of these pinion shafts 36. The carrier body 37 includes a pair of ring-like plates, namely a power source side plate 37a and a non-power source side plate 37b, and connectors 37c. The power source side plate 37a and the non-power source side plate 37b support the ends of the pinion shafts 36 on the power source side and the non-power source side, respectively. The connectors 37c connect the power source side plates 37a to the non-power source side plate 37b. The connectors 37c are arranged between two of the pinion shafts 36 that are adjacent to each other along the circumference of the carrier 33 (see FIG. 3). The pinion shafts 36 are connected integrally via a pin member 38 (see FIG. 2) that is located in the carrier body 37 (specifically, in the power source side plate 37a) to extend along the radius of the carrier 33.

In the automatic transmission 1, the ring gear 14 of the first gear set 10 is always coupled to the sun gear 21 of the second gear set 20 that is located on the outer periphery of the first gear set 10. In this embodiment, the ring gear 14 of the first gear set 10 is integral with the sun gear 21 of the second gear set 20 to serve as a single component.

The ring gear 14 of the first gear set 10 and the sun gear 21 of the second gear set 20 are coupled to the (radially extending) end of a power transmitting member 41 on the power source side. The power transmitting member 41 extends axially from the non-power source side to the power source side right on the outer periphery of the input shaft 2. The end of this power transmitting member 41 on the non-power source side is coupled to another or other planetary gear set(s) and/or frictional engagement element(s) of the transmission mechanism 3 on the non-power source side of the first and second gear sets 10 and 20.

Spline-fitting the non-power source plate 17b of the carrier body 17 to the input shaft 2 always couples the carrier 13 of the first gear set 10 to the input shaft 2. The sun gear 11 of the first gear set 10 is spline-fitted to the end of a power transmitting member 42 on the non-power source side end. The power transmitting member 42 is a shaft member extending axially right on the outer periphery of the input shaft 2. The sun gear 11 of the first gear set 10 is always coupled to the sun gear 31 of the third gear set 30. The sun gear 31 is spline-fitted to the power transmitting member 42 while being adjacent to the sun gear 11 on the power source side. The end of the power transmitting member 42 on the power source side is coupled to another or other planetary gear set(s) and/or frictional engagement element(s) of the transmission mechanism 3 that are closer to the power source side than the output gear 4.

The ring gear 24 of the second gear set 20 is coupled to the (radially extending) end of a power transmitting member 43 on the power source. The power transmitting member 43 extends axially on the outer periphery of the power transmitting member 41. The end of the power transmitting member 43 on the non-power source side is coupled to another or other planetary gear set(s) and/or frictional engagement element(s) of the transmission mechanism 3 on the non-power source side of the two-stage gear set 40.

The carrier 23 of the second gear set 20 is integral with the carrier 33 of the third gear set 30 to serve as a single component. Thus, the carriers 23 and 33 are always coupled to each other. In this embodiment, the power source side plate 27a of the carrier body 27 of the carrier 23 is integral with the non-power source side plate 37b of the carrier body 37 of the carrier 33.

The carrier 33 of the third gear set 30 includes an extension 37d extending from the power source side plate 37a of the carrier body 37 to the power source side. This extension 37d is spline-fitted to the output gear 4. In this manner, the carrier 33 of the third gear set 30 is always coupled to the output gear 4. The output gear 4 meshes with a counter driven gear (not shown) that is supported by a counter shaft (not shown) extending in parallel with the input shaft 2.

A parking gear 5 is spline-fitted to the extension 37d of the carrier 33 of the third gear set 30. The parking gear 5 locks rotation of the counter driven gear when the driver of the vehicle moves a select lever to a position P.

The ring gear 34 of the third gear set 30 is always coupled to the (radially extending) end of a power transmitting member 44 on the power source side. The power transmitting member 44 extends axially on the outer periphery of the ring gear 24 of the second gear set 20. The end of the power transmitting member 44 on the non-power source side is coupled to another or other planetary gear set(s) and/or frictional engagement element(s) of the transmission mechanism 3 on the non-power source side of the two-stage gear set 40.

Lubricant feed passages L1 for the first gear set, lubricant feed passages L2 for the second gear set, and lubricant feed passages L3 will now be described. Each lubricant feed passage L1 feeds a lubricant to the associated bearing 15 between the pinion 12 of the first gear set 10 and the pinion shaft 16 that rotatably supports the pinion 12. Each lubricant feed passage L2 feeds a lubricant to the associated bearing 25 between the pinion 22 of the second gear set 20 and the pinion shaft 26 that rotatably supports the pinion 22. Each lubricant feed passage L3 feeds a lubricant to the associated bearing 35 between the pinion 32 of the third gear set 30 and the pinion shaft 36 that rotatably supports the pinion 32. The number of the lubricant feed passages L1 for the first gear set is equal to the number (three in this embodiment) of the bearings 15 (or the pinions 12) so that the lubricant feed passages L1 are associated with the respective bearings 15. The numbers of the lubricant feed passages L2 and L3 for the second and third gear sets are determined similarly (i.e., three in this embodiment).

Figure 3:
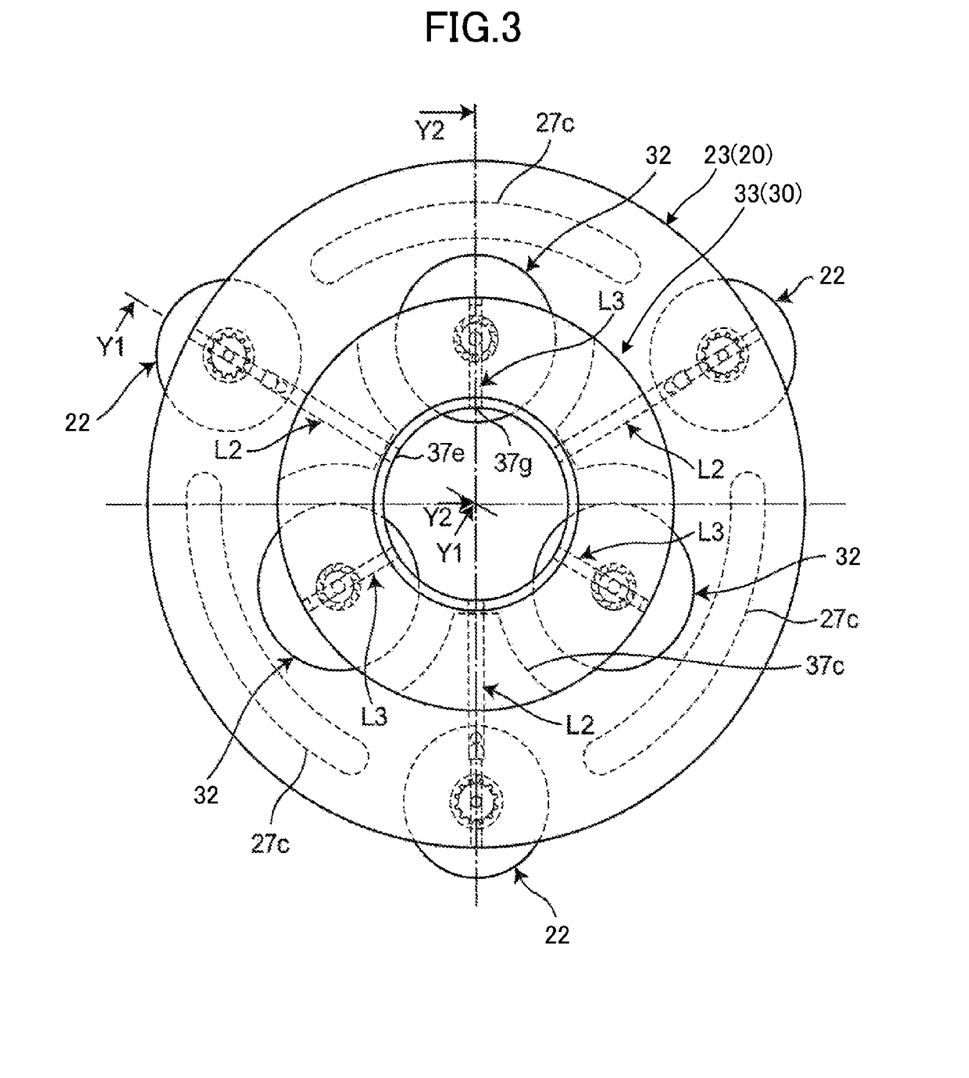

FIG. 3 illustrates the lubricant feed passages for the bearings 15, 25, and 35. FIG. 3 is a schematic view illustrating part of the second and third planetary gear sets 20 and 30 of the automatic transmission as viewed in the direction of arrow from a position along the line Y3-Y3 of FIG. 1. FIG. 1 is a cross-sectional view taken along the line Y1-Y1 of FIG. 3. FIG. 2 is a cross-sectional view taken along the line Y2-Y2 of FIG. 3.

An oil passage 2b, a first oil feed hole 2c, and a second oil feed hole 2d are formed in the input shaft 2. The oil passage 2b extends axially (i.e., along the axis of the input shaft 2). The first and second oil feed holes 2c and 2d penetrate from the oil passage 2b to the outer peripheral surface of the input shaft 2 to allow the lubricant to flow outside along the radius of the input shaft 2 (see FIGS. 1 and 2). An oil reservoir 42a communicating with the first oil feed hole 2c is located between the input shaft 2 and the power transmitting member 42. A circumferential groove 42b that feeds a lubricant to first and second inlets 37e and 37g, which described later, is formed in the outer peripheral surface of the power transmitting member 42 so as to communicate with the oil reservoir 42a.

The lubricant, which has passed through the first oil feed hole 2c, is fed to the oil reservoir 42a between the input shaft 2 and the power transmitting member 42, and then fed from the circumferential groove 42b in the outer peripheral surface of the power transmitting member 42 through the lubricant feed passages L2 and L3 for the second and third gear sets to the bearings 25 and 35 of the second and third gear sets 20 and 30, respectively.

As shown in FIG. 1, each lubricant feed passage L2 for the second gear set includes a first oil passage 37f and an oil passage in the pinion shaft 26 of the second gear set 20. The first oil passage 37f extends radially outside from the first inlet 37e toward the non-power source side of the carrier body 37 of the third gear set 30 (i.e., axially toward the two-stage gear set 40). The first inlet 37e is formed on the power source side of the carrier body 37 of the third gear set 30 (i.e., axially opposite to the two-stage gear set 40) and in an inner peripheral portion, to which the power transmitting member 42 is fitted. The oil passage in the pinion shaft 26 communicates with the first oil passage 37f and the bearing 25.

In this embodiment, the first inlet 37e is formed in the inner peripheral surface of the power source side plate 37a of the carrier body 37. The first oil passage 37f extends from the power source side plate 37a of the carrier body 37 through the connectors 37c to the non-power source side plate 37b (and the power source side plate 27a integral therewith). The oil passage in the pinion shaft 26 includes a main oil passage 26a, a connected oil passage 26b, and a connected oil passage 26c. The main oil passage 26a extends axially (i.e., along the axis of the pinion shaft 26). The connected oil passage 26b extends obliquely and radially outside from the end of the main oil passage 26a on the power source side toward the power source side. The connected oil passage 26c extends radially outside from the main oil passage 26a at substantially the longitudinal center of the pinion shaft 26. The connected oil passage 26b communicates with the first oil passage 37f via an oil passage 27d that extends radially in the power source side plate 27a of the carrier body 27 of the second gear set 20. The connected oil passage 26c communicates with the bearing 25 so that the lubricant is fed from the connected oil passage 26c to the bearing 25.

In this manner, each lubricant feed passage L2 for the second gear set feeds the lubricant to the bearing 25 from the first inlet 37e through the first oil passage 37f and the oil passage in the pinion shaft 26 (i.e., the main oil passage 26a and the connected oil passages 26b and 26c).

As shown in FIG. 2, each lubricant feed passage L3 for the third gear set includes a second oil passage 37h and an oil passage in the pinion shaft 36 of the third gear set 30. The second oil passage 37h extends radially outside in the carrier body 37 of the third gear set 30 from the second inlet 37g. The second inlet 37g is formed on the power source side (i.e., axially opposite to the two-stage gear set 40) of the carrier body 37 of the third gear set 30 and in an inner peripheral portion, to which the power transmitting member 42 is fitted. The oil passage in the pinion shaft 36 communicates with the second oil passage 37h and the bearing 35.

In this embodiment, the second inlet 37g is formed in the inner peripheral surface of the power source side plate 37a of the carrier body 37 like the first inlet 37e. The second oil passage 37h extends radially outside in the carrier body 37 at the end on the power source side, that is, in the power source side plate 37a. The oil passage in the pinion shaft 36 of each lubricant feed passage L3 for the third gear set includes a main oil passage 36a, a connected oil passage 36b, and a connected oil passage 36c. The main oil passage 36a extends axially (i.e., along the axis of the pinion shaft 36). The connected oil passage 36b extends obliquely and radially outside from the end of the main oil passage 36a on the power source side toward the power source side. The connected oil passage 36c extends radially outside from the main oil passage 36a at substantially the longitudinal center of the pinion shaft 36. The connected oil passage 36b communicates with the second oil passage 37h. The connected oil passage 36c communicates with the bearing 35 so that a lubricant is fed from the connected oil passage 36c to the bearing 35.

In this manner, each lubricant feed passage L3 for the third gear set feeds the lubricant from the second inlet 37g to the bearing 35 via the second oil passage 37h and the oil passage in the pinion shaft (the main oil passage 36a and the connected oil passages 36b and 36c).

As shown in FIG. 3, the pinions 22 and 32 are supported by the carriers 23 and 33 that are integral therewith, respectively. The pinions 22 and 32 are located in different positions along the circumference of the carrier 33 (including the carrier 23) and arranged alternately at substantially regular intervals along the circumference of the carrier 33. Accordingly, the lubricant feed passages L2 for the second gear set and the lubricant feed passages L3 for the third gear set are located in different positions along the circumference of the carrier 33 (including the carrier 23) and arranged alternately at substantially regular intervals along the circumference of the carrier 33.

In the carrier body 37 of the third gear set 30, the first and second inlets 37e and 37g are formed in addition to the first and second oil passages 37f and 37h.

As described above, the lubricant feed passages L2 for the second gear set and the lubricant feed passages L3 for the third gear set are arranged alternately at substantially regular intervals along the circumference of the carrier body 37. Accordingly, the first and second inlets 37e and 37g are arranged on the power source side of the carrier body 37 (axially opposite to the two-stage gear set 40) on the inner periphery of the carrier body 37 (in the inner peripheral surface of the power source side plate 37a of the carrier body 37) in positions axially overlapping with each other (substantially the same axial positions) and circumferentially different from each other. In this embodiment, the first and second inlets 37e and 37g are arranged alternately at substantially regular intervals along the circumference of the carrier body 37. Like the first and second inlets 37e and 37g, the first and second oil passages 37f and 37h are arranged alternately in the carrier body 37 at substantially regular intervals along the circumference of the carrier body 37. The portions of the first oil passages 37f near the respective first inlets 37e and the portions of the second oil passages 37h near the respective second inlets 37g are located in positions overlapping with each other (in substantially the same positions) along the axis of the carrier body 37.

The portion of the power transmitting member 42 provided with the circumferential groove 42b is fitted to the inner periphery on the power source side (axially opposite to the two-stage gear set 40) of the carrier body 37 of the third gear set 30. That is, the portion of the power transmitting member 42 provided with the circumferential groove 42b is fitted in the inner peripheral surface of the power source side plate 37a of the carrier body 37. The circumferential groove 42b is located in the same axial position as the first and second inlets 37e and 37g so that a lubricant is fed from the inside of the power transmitting member 42 to the first and second inlets 37e and 37g. In this embodiment, the circumferential groove 42b corresponds to a feed port in the power transmitting member 42. The feed port feeds a lubricant from the inside of the power transmitting member 42 to the first and second inlets 37e and 37g.

If there is no power transmitting member like the power transmitting member 42 between the carrier 33 of the third gear set 30 (i.e., the carrier body 37) and the input shaft 2, the outer peripheral surface of the input shaft 2 may have a feed port. The feed port feeds a lubricant from the inside of the input shaft 2 to the first and second inlets 37e and 37g. An alternative configuration if there is no the power transmitting member may be as follows. The cylindrical circumferential wall of the transmission case that extends axially includes an intermediate wall that extends inside the case so as to be located on the power source side of the third gear set 30. The intermediate wall includes a boss-like cylindrical portion at its inner circumferential end. The cylindrical portion protrudes toward the non-power source side and is fitted to the inner periphery of the carrier body 37. The cylindrical portion includes a feed port in the outer peripheral surface. The feed port feeds a lubricant from the inside of the cylindrical portion to the first and second inlets 37e and 37g. In this case, the input shaft 2 is fitted to the inner periphery of the cylinder. Then, an oil reservoir like the oil reservoir 42a of the power transmitting member 42 is provided between the cylinder and the input shaft 2. The oil reservoir communicates with the first oil feed hole 2c and the feed port. Alternatively, the feed port may communicate with an oil passage passing through the intermediate wall and the cylinder.

The lubricant that has passed through the second oil feed hole 2b is fed to the bearings 15 of the first gear set 10 through the respective lubricant feed passages L1 for the first gear set.

As shown in FIG. 1, each lubricant feed passage L1 for the first gear set includes an oil passage 17d, and an oil passage in the pinion shaft 16 of the first gear set 10. The oil passage 17d is connected to the second oil feed hole 2d, and extends radially in the carrier body 17 of the first gear set 10 at the end of the first gear set 10 on the non-power source side. The oil passage in the pinion shaft 16 communicates with the oil passage 17d in the carrier body and the bearing 15. In this embodiment, this oil passage in the pinion shaft 16 includes a main oil passage 16a, a connected oil passage 16b, and a connected oil passage 16c. The main oil passage 16a extends axially (i.e., along the axis of the pinion shaft 16). The connected oil passage 16b extends obliquely and radially outside from the end of the main oil passage 16a on the non-power source side toward the non-power source side. The connected oil passage 16c extends radially outside from the main oil passage 16a at substantially the longitudinal center of the pinion shaft 16. The connected oil passage 16b communicates with the oil passage 17d in the carrier body. The connected oil passage 16c communicates with the bearing 15 so that a lubricant is fed from the connected oil passage 16c to the bearing 15.

In this manner, each lubricant feed passage L1 for the first gear set feeds the lubricant from the second oil feed hole 2d to the bearing 15 via the oil passage 17d in the carrier body and the oil passage in the pinion shaft (i.e., the main oil passage 16a and the connected oil passages 16b and 16c).

The lubricant feed passages L1 for the first gear set are arranged at substantially regular intervals along the circumference of the carrier 13.

In this embodiment, the second gear set 20 is provided on the outer periphery of the first gear set 10 so that the first and second gear sets 10 and 20 form the two-stage gear set 40. The third planetary gear set is adjacent to the two-stage gear set 40 on one axial side (the power source side). The carrier body 27 of the second gear set 20 is integral with the carrier body 37 of the third gear set 30.

Each lubricant feed passage L2 for the second gear set feeds a lubricant from the first inlet 37e to the bearing 25 between the pinion 22 and the pinion shaft 26 of the second gear set 20 via the first oil passage 37f in the carrier body 37 and the oil passage in the pinion shaft 26 (i.e., the main oil passage 26a and the connected oil passages 26b and 26c) of the second gear set 20. The first inlet 37e is formed on the side of the carrier body 37 of the third gear set 30 that is axially opposite to the two-stage gear set 40 (i.e., the power source side) and on the inner periphery of the carrier body 37.

With this configuration, each lubricant feed passage L2 for the second gear set is continuous from the first inlet 37e to the bearing 25 of the second gear set 20 through the components of the second and third gear sets 20 and 30 (the carrier body 37 of the third gear set 30 as well as the carrier body 27 and the pinion shaft 26 of the second gear set 20). As a result, the lubricant from the first inlet 37e is fed to the bearing 25 without being released to the space without any component in the transmission case. That is, the lubricant is efficiently fed to the bearing 25 of the second gear set 20, while reducing an increase in the size and driving loss of an oil pump, for example.

On the other hand, the carrier body 37 of the third gear set 30 includes the second oil passages 37h of the lubricant feed passages L3 for the third gear set, which feed a lubricant to the respective bearings 35 between the pinions 32 and the pinion shafts 36 of the third gear set 30. The problem in providing the first oil passages 37f in the carrier body 37 is how to arrange the first oil passages 37f with respect to the second oil passages 37h. In this embodiment, however, the first oil passages 37f are located in positions in the carrier body 37 different from the second oil passages 37h along the circumference of the carrier body 37. As a result, the first and second oil passages 37f and 37h are arranged in the carrier body 37 in positions axially overlapping with each other. In this embodiment, the portions of the first oil passage 37f near the respective first inlets 37e and the portions of the second oil passages 37h near the respective second inlets 37g axially overlap with each other in the carrier body 37. This reduces the axial size of the automatic transmission 1 as compared to the arrangement of the first oil passages 37f axially shifted from the second oil passages 37h in the carrier body 37. That is, this configuration reduces the axial size of the automatic transmission 1 as much as possible in addition to the provision of the two-stage gear set 40 of the automatic transmission 1, thereby improving the mountability of the automatic transmission 1 in the vehicle.

In this embodiment, each lubricant feed passage L3 for the third gear set feeds the lubricant from the second inlet 37g to the bearing 35 of the third gear set 30 via the second oil passage 37h in the carrier body 37 and the oil passage in the pinion shaft 36 of the third gear set 30 (i.e., the main oil passage 36a and the connected oil passages 36b and 36c). The second inlet 37g is located on the side of the carrier body 37 of the third gear set 30 that is axially opposite to the two-stage gear set 40 (i.e., the power source side) and on the inner periphery of the carrier body 37. On the power source side and inner periphery of the carrier body 37 of the third gear set 30, the first and second inlets 37e and 37g are arranged in the positions that axially overlap with each other and are circumferentially different from each other. Thus, the first oil passages 37f are easily provided in the positions in the carrier body 37 different from the second oil passages 37h along the circumference of the carrier body 37. This further reduces the axial size of the automatic transmission 1 as compared to the case of axially shifting the first inlets 37e from the second inlets 37g.

In this embodiment, the power transmitting member 42 includes the circumferential groove 42b. The power transmitting member 42 is fitted on the side of the carrier body 37 of the third gear set 30 axially opposite to the two-stage gear set 40 and on the inner periphery of the carrier body 37. The circumferential groove 42b is a feed port feeding a lubricant from the inside of the power transmitting member 42 to the first and second inlets 37e and 37g. The circumferential groove 42b serves as the feed port feeding a lubricant to both the first and second inlets 37e and 37g. This simplifies the oil feed passage in the power transmitting member 42 as compared to the case of providing individual feed ports. The present invention is not limited to the embodiment and various modifications and alternations may be made within the scope of the claims.

For example, while the third gear set 30 is adjacent to the two-stage gear set 40 on the power source side in the embodiment, the third gear set 30 may be adjacent to the two-stage gear set 40 on the non-power source side. In this case, the first inlets 37e are formed on the non-power source side of the carrier body 37 of the third gear set 30 (i.e., axially opposite to the two-stage gear set 40) and on the inner periphery of the carrier body 37.

While each of the first, second, and third gear sets 10, 20, and 30 includes there pinions 12, 22, or 32, respectively in the embodiment described above, the number of the pinions 12, 22, and 32 may be one, two, four, or more.

The embodiment described above is a mere example and is not intended to be construed as limiting the scope of the present invention. The scope of the present invention is defined by the claims. All modifications and alternations of the claims and equivalents fall within the scope of the present invention.

INDUSTRIAL APPLICABILITY

The present invention is useful for an automatic transmission including a two-stage planetary gear set and feeding a lubricant to a bearing between a pinion and a pinion shaft of a planetary gear set located on the outer periphery of the two-stage planetary gear set.

DESCRIPTION OF REFERENCE CHARACTERS

1 Automatic Transmission
10 First Planetary Gear Set
11 Sun Gear of First Planetary Gear Set
12 Pinion of First Planetary Gear Set
13 Carrier of First Planetary Gear Set
14 Ring Gear of First Planetary Gear Set
15 Bearing of First Planetary Gear Set
16 Pinion Shaft of First Planetary Gear Set
17 Carrier Body of First Planetary Gear Set
20 Second Planetary Gear Set
21 Sun Gear of Second Planetary Gear Set
22 Pinion of Second Planetary Gear Set
23 Carrier of Second Planetary Gear Set
24 Ring Gear of Second Planetary Gear Set
25 Bearing of Second Planetary Gear Set
26 Pinion Shaft of Second Planetary Gear Set
26a Main Oil Passage (Oil Passage in Pinion Shaft)
26b Connected Oil Passage (Oil Passage in Pinion Shaft)
26c Connected Oil Passage (Oil Passage in Pinion Shaft)
27 Carrier Body of Second Planetary Gear Set
30 Third Planetary Gear Set
31 Sun Gear of Third Planetary Gear Set
32 Pinion of Third Planetary Gear Set
33 Carrier of Third Planetary Gear Set
34 Ring Gear of Third Planetary Gear Set
35 Bearing of Third Planetary Gear Set
36 Pinion Shaft of Third Planetary Gear Set
36a Main Oil Passage (Oil Passage in Pinion Shaft)
36b Connected Oil Passage (Oil Passage in Pinion Shaft)
36c Connected Oil Passage (Oil Passage in Pinion Shaft)
37 Carrier Body of Third Planetary Gear Set
37e First Inlet
37f Oil Passage in First Carrier Body
37g Second Inlet
37h Oil Passage in Second Carrier Body
42 Power Transmitting Member (Shaft Member)
42b Circumferential Groove (Feed Port)
L2 Lubricant Feed Passage for Second Planetary Gear Set
L3 Lubricant Feed Passage for Third Planetary Gear Set

The invention claimed is:
1. An automatic transmission comprising first, second, and third planetary gear sets, each including
  a sun gear,
  a ring gear,
  a pinion meshing with the sun gear and the ring gear, and
  a carrier supporting the pinion, and including a pinion shaft rotatably supporting the pinion, and a carrier body supporting two ends of the pinion shaft, wherein
  the second planetary gear set is located on an outer periphery of the first planetary gear set so that the first and second planetary gear sets form a two-stage planetary gear set,
  the third planetary gear set is adjacent to the two-stage planetary gear set on one axial side of the automatic transmission,
  the carrier body of the second planetary gear set is integral with the carrier body of the third planetary gear set,
  the automatic transmission further comprises a lubricant feed passage for the second planetary gear set feeding a lubricant to a bearing between the pinion and pinion shaft of the second planetary gear set,
  the lubricant feed passage for the second planetary gear set includes
    a first oil passage in the carrier body of the third planetary gear set, the first oil passage extending from a first inlet axially toward the two-stage planetary gear set and radially outside, the first inlet being formed on a side of the carrier body of the third planetary gear set axially opposite to the two-stage planetary gear set and on an inner periphery of the carrier body of the third planetary gear set, and
    an oil passage in the pinion shaft of the second planetary gear set, the oil passage communicating with the first oil passage and the bearing of the second planetary gear set, and
  the lubricant feed passage for the second planetary gear set feeds the lubricant from the first inlet to the bearing of the second planetary gear set via the first oil passage and the oil passage in the pinion shaft of the second planetary gear set.

2. The automatic transmission of claim 1, further comprising:
a lubricant feed passage for the third planetary gear set feeding a lubricant to a bearing between the pinion and pinion shaft of the third planetary gear set, wherein
the lubricant feed passage for the third planetary gear set includes
a second oil passage in the carrier body of the third planetary gear set, the second oil passage extending from a second inlet radially outside, the second inlet being formed on the side of the carrier body of the third planetary gear set axially opposite to the two-stage planetary gear set and on the inner periphery of the carrier body of the third planetary gear set, and
an oil passage in the pinion shaft of the third planetary gear set, the oil passage communicating with the second oil passage and the bearing of the third planetary gear set,
the lubricant feed passage for the third planetary gear set feeds the lubricant from the second inlet to the bearing of the third planetary gear set via the second oil passage and the oil passage in the pinion shaft of the third planetary gear set, and
on the side of the carrier body of the third planetary gear set axially opposite to the two-stage planetary gear set and on the inner periphery of the carrier body of the third planetary gear set, the first and second inlets are arranged in positions axially overlapping with each other and being circumferentially different from each other.

3. The automatic transmission of claim 2, further comprising:
a shaft member fitted to the inner periphery of the carrier body of the third planetary gear set on the side axially opposite to the two-stage planetary gear set, wherein
the shaft member includes a feed port feeding a lubricant from an inside of the shaft member to the first and second inlets.

* * * * *